United States Patent [19]

Flango, Jr. et al.

[11] Patent Number: 4,906,489

[45] Date of Patent: Mar. 6, 1990

[54] ASEPTICALLY-PACKAGED PUDDING

[75] Inventors: William E. Flango, Jr., Hamilton Township, Mercer County; Theodore H. Joseph, East Windsor; Douglas M. Lehmann, Howell Township, Monmouth County, all of N.J.; Jimbay Loh, Cortlandt, N.Y.; David R. Rourke, East Windsor, N.J.

[73] Assignee: General Foods Corporation, White Plains, N.Y.

[21] Appl. No.: 265,617

[22] Filed: Nov. 1, 1988

[51] Int. Cl.$^4$ ............................................. A23L 1/187
[52] U.S. Cl. .................................. 426/579; 426/106; 426/399
[58] Field of Search ................. 426/579, 578, 106, 399

[56] References Cited

U.S. PATENT DOCUMENTS

| | | | |
|---|---|---|---|
| 3,770,461 | 11/1973 | Stewart, Jr. et al. | 426/380 |
| 3,852,503 | 12/1974 | Magnino et al. | 426/364 |
| 4,262,031 | 4/1981 | Carpenter et al. | 426/548 |
| 4,609,554 | 9/1986 | Barva et al. | 426/43 |
| 4,623,552 | 11/1986 | Rapp | 426/575 |
| 4,788,075 | 11/1988 | Joseph et al. | 426/579 |

Primary Examiner—Donald E. Czaja
Assistant Examiner—Evan Federman
Attorney, Agent, or Firm—Thomas R. Savoie; Daniel J. Donovan

[57] ABSTRACT

Aseptically-packaged pudding products are produced wherein the pudding additionally contains a protein aggregating agent selected from the group consisting of heat-coaguable protein, food acids, food acid salts, food bases, food base salts and combinations thereof. The puddings are particularly useful for making layered pudding products.

8 Claims, No Drawings

ASEPTICALLY-PACKAGED PUDDING

BACKGROUND OF THE INVENTION

Consumers have in recent times been desirous of eating wholesome and nutritious snack foods. Milk containing puddings have long been considered nutritious and wholesome foods. Consumers are, however, requiring that the foods they eat, particularly snack food and dessert items, be essentially ready-to-eat. Thus, the amounts of cooked puddings and even instant puddings prepared in the home environment has been decreasing in recent years.

To fill the desire of consumers for pudding dessert or snack items which require no preparation on the part of the consumer, there exists ready-to-eat puddings which are usually marketed in single-service portions. Initially these products were marketed as shelf-stable canned products. These canned puddings which have been subjected to a retort step during processing do not possess the texture and flavor which consumers associate with home-cooked pudding. More recently, single-service portions of refrigerated, aseptically-packaged pudding products have entered the market.

A process and formulations for preparing aseptically-packaged pudding is described in commonly-assigned, U.S. Pat. No. 4,788,075 to Joseph et al. This patent is hereby incorporated by reference. The Joseph et al. patent describes the preparation of aseptically-packaged pudding which has a creamy texture comparable to cooked pudding and which contains milk solids, fat and a relatively low level (below 5%) of a chemically-modified food starch. This low starch level results in pudding formulations which have a relatively low on-line viscosity.

On-line viscosity is the viscosity exhibited by the pudding formulation during and shortly after the heat treatment step which is an integral part of aseptic processing. This low on-line viscosity and low starch level is desirable in terms of being able to cool the heated pudding in fixed plate heat exchangers as called for in the aforementioned patent; however, it has been found that the on-line pudding viscosity may be undesirably low. A low on-line viscosity can result in splashing or sloshing of the pudding formulation at the package filling station. If pudding splashes onto the rim of the package, a hemetic seal between the package and subsequently applied flexible lid material will not be formed. It has also been found that a low on-line viscosity makes it difficult to clearly layer differing (e.g., different colored) pudding formulations. Well defined or clean layers are desirable for producing parfait-type pudding products, especially when such puddings are to be packaged in clear or translucent plastic cups.

It would of course be possible to increase on-line viscosity by adding starch to the formulation or by making the pudding extremely cold during the filling step; however, both of these solutions can produce textures in the ready-to-eat pudding that may be considered undesirable.

It is therefore a object of this invention to produce an aseptically-packaged pudding which has a desirable pudding texture, as consumed, and which has an on-line viscosity which is high enough to prevent excessive splashing and low enough to be cooled with fixed plate heat exchangers.

It is a further object of this invention to permit the production of layered, aseptically-packaged desserts where a clear line of demarcation exist between contiguous pudding layers such that, when differently-colored puddings are layered in a clear, plastic cup, well-defined layers are observed.

SUMMARY OF THE INVENTION

An improved aseptically-packaged pudding product is prepared by adding sufficient protein aggregating agent to the pudding formulation to provide a pudding of increased on-line viscosity, such that splashing of the pudding formulation during packaging of the pudding is reduced and the possibility of forming defective seals in the aseptically-packaged product is minimized. This invention is particularly useful for producing pudding products which contain plural layers of different colored pudding. The increased on-line viscosity enables a lower pudding layer to hold-up a subsequently applied upper layer so that a clean line of demarcation to be produced between adjacent pudding layers.

According to this invention, the thickening is accomplished by manipulating or enhancing the milk protein set. Protein manipulation is effected by adding a heat-coaguable protein material, such as liquid whey protein, which will increase the level of protein and thus increase the level of protein aggregates in the aseptically-processed pudding. Alternatively, pH-modifying ingredients such as food acid, food acid salts or combinations thereof may be added to the pudding formulation in order to produce increased protein aggregation of the milk proteins which are present in the pudding formulation. Naturally, a combination of the two techniques may be employed.

The increased protein aggregation which is sought for the low starch-containing pudding formulations used in this invention must be sufficient to raise the on-line viscosity of pudding at the filling station to from below 6 to between 6 and 15. Preferably on-line viscosity is raised to between 8 and 12. As used herein on-line viscosity is measured using a Model HAT Brookfield Viscometer TM (a product of Brookfield Engineering Laboratories, Inc., Stoughton, Mass.) at 5 RPM using a helipath stand and a T-B bar spindle, 0–100 scale and 75° F. (28.9° C.). Changes in the level of protein aggregation within the formulation can be visually observed using protein-staining and a microscope at a magnification of 20X or more, preferably 100–400X.

"Pudding" as used herein is meant to refer to creamy-textured food products containing milk solids, fat and starch. Any percents given are percents by weight and in the case of puddings containing discrete particles or pieces, such as nuts or fruit, the weight percent is basis, the pudding phase only.

DESCRIPTION OF THE INVENTION

Aseptically-packaged pudding formulations are produced which have a low starch content and a desirably high on-line viscosity. This invention is useful for producing either a completely homogeneous pudding product or when it is desired to layer at least two different pudding formulations into a container, such as single-service cup.

This invention is most useful where the contents of the container are visible to the consumer through the sidewall of the container such as would be the case with a clear or translucent plastic cup. In this instance, each container will contain at least two visually-distinct layers having different pudding formulations (e.g. chocolate and vanilla); however, the exact number of layers or formulations within each container is only limited by commercial practicalities.

According to this invention, the pudding formulation, or, in the case of a layered or parfait pudding, at least one of the pudding formulations, contains a protein aggregating agent in an amount which is effective to increase the on-line viscosity of the formulation to between 6 and 15 and, in the case of layered products, effective to prevent adjacent layers of pudding from flowing into and/or disrupting the surface of the adjacent layers. In the case of layered products, one or more of the pudding layers and one or more of the pudding formulations may contain a protein aggregating agent, depending upon the actual, on-line viscosity which exists in the pudding at the time layering takes place.

According to the present invention, the pudding formulations contain water, 3% to 15% skim milk solids, from 3.5 to 10% of a fat or fat substitute from 2.5 to 4.2% of an essentially amylose-free, chemically-modified starch, and from about 0.12 to 0.2% of an anionic surfactant, such as calcium or sodium stearyol-2-lactylate or sodium lauryl sulfate. When a protein aggregating agent is present in the pudding formulation it will usually be present at a level of from about 0.01 to 2.0% and selected from group consisting of heat coaguable protein, food acids, food acid salts and combinations thereof. Basis the amount of skim milk solids (about 36% protein) contained in the formulation the level of protein-aggregating agent will be about 0.15 to 10%.

Preferably, all of the pudding formulations are processed so that the fat and surfactant are completely dispersed prior to the time the formulation is heated to the point where the starch is cooked. Dispersion of the fat and surfactant may be effected by the use of an elevated temperature of between 125° and 160° F. (51.7° and 71.1° F.) for both mixing and homogenizing the pudding formulation. After homogenization, the formulations are subjected to a conventional "high-temperature, short-time (HTST) treatment" which is sufficient both to render the formulation commercially sterile and to fully gelatinize the starch contained in the formulation.

The HTST heat treatment is conducted to achieve a temperature of at least 265° F. (129.4° F.). A swept-surface heat exchanger may be used to effect this heating. Thereafter, the pudding formulation is cooled, in one or more heat exchangers, to a fill temperature which will typically be about 60° to 90° F. (15.5° to 32.2° F.). At this point, the pudding formulation is fed to a container. If a layered product is being produced, then differing pudding formulations are fed to a container in a desired pattern in order to produce a parfait or multilayered pudding product.

The fats most suitable for use in this invention will have a relatively-high melting point over 90° F. (32.2° F.), preferably over 100° F. (37.8° F.). The fats which are most commonly used in this invention are those which either alone or in combination possess a lauric acid content of at least 20% by weight, such as coconut oil and palm kernel oil. Other fats such as milk fat and partially or fully hydrogenated vegetable oils (e.g., soybean, cottonseed, etc.) may also be utilized either alone or in combination.

The surfactant is used at a level of from about 0.12 to 0.2% by weight of the pudding. Sodium-stearyl-2-lactylate, a preferred surfactant, is a known emulsifier for use in puddings and is approved for use in puddings at a level not to exceed 0.2% (21 CFR 172.846). This material which is commercially-available under the name Emplex$^{TM}$, a product of Patco Co. of Kansas City, Kansas has a melting point of about 108° F. (42° F.).

When whey protein is employed as the protein aggregating agent, the level of use will be from 0.2 to 10% based on the weight of the skim milk solids contained in the pudding. When phosphoric acid is employed as the protein aggregating agent, the level will be 0.15 to 0.7% by weight of skim milk solids. Other heat-coaguable proteins, such as egg protein, gelatin and soy protein may be used at levels comparable to the levels employed for whey protein. Other food acids would be citric, hydrochloric, lactic and the like. Bases such as sodium and potassium hydroxides, carbonates and bicarbonates would be useful. Salts such as disodium phosphate, tetrasodium phosphate, sodium citrate would also be useful. The use levels for acids and salts would be from 0.01 to 0.7% by weight of skim milk solids.

The aseptic-packaging process includes the steps of sterilizing the containers and lids into which the sterilized pudding is packaged and then filling the container with pudding in an enclosed sterile environment. Such known methods as superheated steam, hydrogen peroxide, ultraviolet light, etc. are useful for sterilizing the packaging materials which, in the case of pudding, are typically comprised of single service, cup-shaped plastic containers and flexible lid stock. The lid stock, may be foil-laminated polyester with a heat-sealable coating which will be heat sealed onto the container. The plastic container may be a thermoformed or molded container fabricated from a material such as high-impact polystyrene.

This invention is further described but not limited by the following example

EXAMPLE 1

A control vanilla-flavored pudding was prepared having the following formulation:

| Ingredient | Weight |
| --- | --- |
| Water | 48.34 |
| Condensed Skim Milk (30% solids) | 24.17 |
| Sucrose | 17.15 |
| Hydrogenated Coconut and Palm Kernel Oils (M.P. about 102° F.) | 5.62 |
| Modified Food Starch | 3.80 |
| Flavor | 0.55 |
| Salt | 0.20 |
| Sodium Stearyol Lactylate | 0.18 |

The pudding was prepared by adding water and skim milk solids to a batch tank and heating to 135° F. (57.2° F.). The remaining ingredients (except flavors) were then added and the temperature of the mix was again brought to 135° F. (57.2° F.). Flavors were added and the mix was homogenized at 2000 psig in a first stage and 500 psig in a second stage. The temperature was maintained at about 135° F. to 145° F. (57.2° to 62.8° F.) during homogenization. The mixture was then cooled to about 70° F. (21° F.) and held in a tank prior to being pumped in a continuous manner through a series of plate heat exchangers, wherein the temperature is raised to 185° F. (85° F.) and then through a series of scraped-surface heat exchanger where the temperature is elevated to 285° F. (140.6° F.). The formulation is maintained at 285° F. (140.6° F.) for about 15 seconds and then immediately cooled to about 110° F. (43° F.). The pudding formulation is then cooled to 75° F. (23.9° F.) and is ready to be aseptically-packaged.

EXAMPLE 2

Using the procedure described in Example 1 two vanilla puddings were prepared according to the following formulations:

| Ingredient | Weight % | Weight % |
|---|---|---|
| Water | 48.87 | 48.13 |
| Condensed Skim Milk | 22.64 | 24.03 |
| Sucrose | 17.17 | 17.17 |
| Hydrogenated Coconut/Palm Kernel Oils | 5.62 | 5.62 |
| Modified Food Starch | 3.80 | 3.80 |
| Whey Protein Concentrate (35% protein) | 1.00 | — |
| Phosphoric Acid Solution (7.5% conc.) | — | 0.32 |
| Flavor | 0.55 | 0.55 |
| Sodium Stearyol Lactylate | 0.20 | 0.20 |
| Salt | 0.18 | 0.18 |

Both the whey protein variant and the phosphoric acid variant puddings showed a definite increase in protein aggregation, indicating a stronger and more extensive protein network. Both variants also showed an increase in on-line viscosity with both the whey protein and phosphoric acid variants being measured at 75° F. as 8-10 on Model HAT Brookfield Viscometer™, 5 RPM using a helipath stand and a T-B bar spindle, 0-100 scale. The comparable viscosity for the control formulation of Example 1 was 3-5. The organoleptic texture and taste of the variants was comparable to the control pudding. The flavor of the whey protein variant after several weeks of refrigerated storage was slightly more dairy-like than the control.

EXAMPLE 3

The vanilla puddings of Example 1 and 2 were each layered into translucent polyethylene cups with alterating layer of a chocolate pudding to produce parfait pudding products. The formulation of the chocolate pudding was as follows:

| Ingredient | Weight % |
|---|---|
| Water | 49.5 |
| Condensed Skim Milk | 22.0 |
| Sucrose | 17.0 |
| Hydrogenated Coconut/Palm Kernel Oil | 4.6 |
| Modified Food Starch | 3.8 |
| Cocoa Powder | 2.5 |
| Sodium Stearyol Lactylate | 0.2 |
| Flavor | 0.2 |

-continued

| Ingredient | Weight % |
|---|---|
| Salt | 0.2 |

The on-line viscosity of the chocolate pudding was inherently within the desirable range of 6-15 (Model HAT Brookfield Viscometer™, 5 RPM using a helipath stand and a T-B bar spindle, 0-100 scale, at 75° F.) so that addition of a protein aggregating agent was not necessary. The parfaits which contained the vanilla pudding of Example 1 exhibited an indistinct, poorly-defined demarcation line between the alternating layers. The parfaits which contained the vanilla puddings of Example 2 exhibited a clean and clear line of demarcation between adjacent layers of vanilla and chocolate puddings.

What is claimed is:

1. An aseptically-packaged, vanilla flavored skim milk solids-containing pudding having a starch level of below 5.0% by weight, wherein the pudding contains a protein aggregating agent in an amount effective to increase the on-line viscosity of the pudding at the filling station to a value of at least 6 on the Model HAT Brookfield Viscometer at 5 RPM, using a helipath stand and a T-B bar spindle, 0-100 at 75° F., by increasing the milk protein set, said protein aggregating agent being selected from the group consisting of heat-coaguable protein, food acids, food acid salts, and combinations thereof.

2. An asceptically-packaged, multi-layered pudding product containing at least two adjacent, visually-distinct pudding layers within the package wherein at least one of said pudding layer is the pudding of claim 1.

3. The aseptically-packaged pudding of claim 1 wherein the protein aggregating agent is selected from the group consisting of whey protein, egg protein, gelatin, soy protein and combinations thereof at a level of from 0.2 to 10% by weight of the non-fat milk solids contained in the pudding.

4. The aseptically-packaged pudding of claim 3 wherein the protein aggregating agent is whey protein.

5. The aseptically-packaged pudding of claim 1 wherein the protein aggregating agent is selected from the group consisting of food acids, food acid salts and combinations thereof at a level of from 0.01 to 0.7% by weight of the non-fat milk solids contained in the pudding.

6. The aseptically-packaged pudding of claim 5 wherein the protein aggregating agent is phosphoric acid at a level of from 0.15 to 0.7% by weight of the non-fat milk solids contained in the pudding.

7. The aseptically-packaged pudding product of claim 1 wherein the protein aggregating agent is present at a level effective to increase the on-line viscosity to between 8 and 12.

8. The aseptically-packaged pudding of claim 1 which contains 3 to 5% skim milk solids, 3.5 to 10% fat, 2.5 to 4.2% modified food starch and 0.12 to 2.0% anionic surfactant.

* * * * *